United States Patent
Haszler et al.

(10) Patent No.: US 6,302,973 B1
(45) Date of Patent: Oct. 16, 2001

(54) HIGH STRENGTH AL-MG-ZN-SI ALLOY FOR WELDED STRUCTURES AND BRAZING APPLICATION

(75) Inventors: Alfred Johann Peter Haszler, Valendar (DE); Desikan Sampath, Beverwijk (NL)

(73) Assignees: Corus Aluminium Walzprodukte GmbH, Koblenz; Corus Aluminium Profiltechnik GmbH, Vogt, both of (DE)

( * ) Notice: Subject to any disclaimer, the term of this patent is extended or adjusted under 35 U.S.C. 154(b) by 0 days.

(21) Appl. No.: 09/462,866

(22) PCT Filed: Jul. 31, 1998

(86) PCT No.: PCT/EP98/04962

§ 371 Date: Mar. 22, 2000

§ 102(e) Date: Mar. 22, 2000

(87) PCT Pub. No.: WO99/07906

PCT Pub. Date: Feb. 18, 1999

(30) Foreign Application Priority Data

Aug. 4, 1997 (EP) .................................................. 97202366
Feb. 23, 1998 (EP) .................................................. 98200561

(51) Int. Cl.$^7$ .................................................. C22C 21/10
(52) U.S. Cl. .................... 148/437; 148/440; 420/541
(58) Field of Search ................................ 420/541, 544; 148/440, 437

(56) References Cited

U.S. PATENT DOCUMENTS 3,332,773 * 7/1967 Dudas et al. .......................... 75/146
5,976,278 * 11/1999 Sircar .................................. 148/550

FOREIGN PATENT DOCUMENTS

| 0173632 | | 3/1986 | (EP) . |
|---|---|---|---|
| 1029486 | * | 5/1966 | (GB) . |
| 1201656 | * | 8/1970 | (GB) . |
| 53-097199 | * | 8/1978 | (JP) . |
| 54-001213 | * | 1/1979 | (JP) . |
| 54-065110 | * | 5/1979 | (JP) . |
| 58-171546 | * | 10/1983 | (JP) . |
| 60-224741 | * | 11/1985 | (JP) . |
| 60-234955 | * | 11/1985 | (JP) . |
| 579333 | * | 11/1977 | (SU) . |
| 9612829 | | 5/1996 | (WO) . |

OTHER PUBLICATIONS

Patent Abstracts of Japan, vol. 018, No. 632, Dec. 2, 1994 & JP 06240424 dated Aug. 30, 1994.

Patent Abstracts of Japan, vol. 095, No. 011 Dec. 26, 1995 & JP 07228957 dated Aug. 29, 1995.

Raynaud, G.M., "New Aluminium Products for High Speed Light Crafts," International Forum on Aluminium Ships, Sep. 20, 1995, pp. 1–18.

* cited by examiner

Primary Examiner—George Wyszomierski
Assistant Examiner—Janelle Combs-Morillo
(74) Attorney, Agent, or Firm—Stevens, Davis, Miller & Mosher, LLP

(57) ABSTRACT

Aluminium-magnesium-zinc-silicon alloy, preferably in the form of a plate or a sheet or an extrusion, having the following composition in weight percent: Mg 0.5–1.5; Zn 0.1–3.8; Si 0.05–1.5; Mn 0.2–0.8; Zr 0.05–0.25; Cr 0.3 max.; Cu<0.3; Fe 0.5 max.; Ag 0.4 max.; Ti 0.2 max.; balance Al and inevitable impurities.

15 Claims, No Drawings

HIGH STRENGTH AL-MG-ZN-SI ALLOY FOR WELDED STRUCTURES AND BRAZING APPLICATION

FIELD OF THE INVENTION

The present invention relates to an aluminium-magnesium-zinc-silicon alloy, preferably in the form of semi-fabricated products like extrusions, plates, coil or sheets, which is particularly suitable to be used in welded or brazed structures and all other applications where the beneficial combination of properties is helpful. For example, the extrusions of this invention can be used in the welded construction of marine transportation vessels such as catamarans or monohull type, fast ferries, but also in bridges and offshore structures. An example of coil and sheet products would be the use as the core alloy for brazing sheet to be brazed in for example heat exchangers. Sheets may have a thickness in the range of less than 6 mm, e.g. 0.5 mm. The plates of the alloy of this invention can be used for example in the construction of ships, offshore structures, silos, bridges and armoured vehicles. Plates may have a thickness in the range of a few mm, e.g. 5 mm, up to 400 mm. Further the alloy in accordance with the invention can be used as weld filler wire.

DESCRIPTION OF THE RELATED ART

Extrusions and rolled products of Al-Mg-Si-type alloys are being used extensively in the construction of marine vehicles and other applications resulting in the construction of large welded structures. In case of marine vessels, AA6082 alloy is being used in the construction of primarily hulls and to a lesser extent in superstructures. The advantage with the AA6082 alloy is that it represents the most widely used, commercially available strongest marine grade alloy. However, this alloy suffers from the following disadvantages: in the case of extrusions low extrudability (as compared to AA6063), lower strength after welding (for example: as compared to 7XXX) and quench sensitivity. In extrusions the reduced extrudability of this alloy consequently limits the shape and the minimum wall thickness of the profiles that can be produced using this alloy. Any increase in Mg or Si or Mn levels of AA6082 causes drastic reduction in the extrudability. Although commercially available 7XXX series alloys can be stronger than AA6082 in the welded condition, they do not qualify as marine grade alloys due to severe corrosion in the heat affected zone. One of the known methods of controlling the stress corrosion in 7XXX series alloys is to reduce the Zn and Mg levels. However, this approach leads to substantial strength loss in both welded and unwelded conditions. Another known method is to add Cu to 7XXX series alloys to a level of more than 0.4 wt.%, which in turn deteriorates resistance to pitting. There exists up to the present no 6XXX-series or 7XXX-series alloy, that as extrusions is better extrudable than AA6082, and having higher strength after welding plus a corrosion resistance similar to that of AA6082 as extrusions and rolled products.

For brazing applications to produce aluminium heat exchangers usually clad products with a combination of 3XXX-series core alloys and a cladding of alloy 4XXX-series are used extensively. After mechanical assembling of stamped parts these heat exchangers are brazed in vacuum or in flux controlled atmosphere combinations at temperatures where the 4XXX-series alloys due to their eutectic composition is melting. The 3XXX-series alloy remains solid after brazing but is softened to very low strength due to the exposure to temperatures around 600° C. during brazing. These low properties of the core alloy limits the minimum thicknesses and weight of the heat exchangers. Therefore, alloys which give higher strength after brazing would be beneficial for downgauging. Such alloys have to be in a melting range which is at least slightly above the brazing temperature. The core alloy should have a good corrosion resistance after brazing especially in salt atmosphere. Such corrosion behaviour is influenced by Si diffusion of the clad 4XXX-series alloy during brazing. Alloys which avoid extensive Si-diffusion e.g. by keeping non-recrystallised or pan-cake structures or by other microstructural means, are beneficial.

Some other disclosures of Al—Mg—Zn—Si alloys found in the prior art literature will be mentioned below.

EP-B-0173632 describes an alloy for extruded or rolled products having a microstructure which is essentially non-recrystallised, and has a preference for high Cu levels. The chemical composition is, in wt. %:

Si 0.9–1.2
Mg 0.7–1.1
Mn 0.25–0.75
Cu 0.30–1.1, preferably 0.8–1.0
Zr 0.07–0.20
Zn 0.10–0.70, preferably 0.30–0.60
Fe <0.30
balance Al.

WO-A-96/12829 describes a method for the production of AlSiMgCu alloy products in the T6-temper having enhanced intercrystalline corrosion resistance. The chemical composition of the product is, in wt. %:

Si 0.7–1.3
Mg 0.6–1.1
Mn 0.3–0.8
Cu 0.5–1.1
Zr <0.20
Fe <0.30
Zn <1.0
Ag <1.0
Cr <0.25 balance Al, and with the proviso that Mg/Si <1.
The proviso Mg/Si<1 is required to obtain the desired corrosion resistance levels, and the high Cu content is required to obtain the desired strength levels and to obtain thermal stability of the alloy. The examples, both comparative and within the invention, all have a maximum Zn content of 0.15% and a Cu content of 0.8% or more.

SUMMARY OF THE INVENTION

One object of the present invention is to provide an Al—Mg—Zn—Si alloy rolled product or extrusion with substantially improved strength in the welded condition as compared to the standard AA6082 alloy and having a corrosion resistance at least equivalent to that of the standard AA6082 alloy. It is also an object to provide alloy rolled products or extrusions which can offer ductility, weldability, and formability at least equivalent to those of AA6082.

A further object of the present invention is to provide an Al—Mg—Zn—Si alloy rolled product or extrusion with substantially improved strength after brazing as compared to the standard 3XXX-series alloys, e.g. AA3003. It is also an object to provide alloy rolled products or extrusions which have a melting range which is above brazing temperature, having a good corrosion resistance, and can offer ductility, weldability (in order to produce tubes prior to brazing), and formability at least equivalent to those of standard 3XXX-series alloys.

According to the invention there is provided an Al—Mg—Zn—Si alloy in the form of a plate or a sheet or an extrusion, having the following composition in weight percent:

Mg 0.5–1.5
Zn 0.1–3.8
Si 0.05–1.5
Mn 0.2–0.8
Zr 0.05–0.25
Cr 0.3 max.
Cu <0.3
Fe 0.5 max.
Ag 0.4 max.
Ti 0.2 max.
balance Al and inevitable impurities.

The present invention we can provide alloy plate or extrusion having higher strength than AA6082, and particularly the welded joints of the present alloy can have higher strength than the standard AA6082 welds, while maintaining a good corrosion resistance.

The present invention can further provide alloy sheet or extrusion having higher post-braze strength than the standard 3XXX-series alloys.

The invention also provides in a welded structure having at least one welded plate or extrusion of the alloy set out above. Preferably the proof strength of the weld is at least 135 MPa.

The invention also provides in a brazed structure having at least one sheet or extrusion of the alloy set out above. The alloy is capable of obtaining in the post-brazing state proof strength of at least 70 MPa, and in a more preferred embodiment of at least 90 MPa.

It is believed that the improved properties available with the invention, particularly higher strength levels in both welded condition and post-braze condition, result from a combination of a fine distribution of GP-zones, $MgZn_2$-type and $Mg_2Si$-type precipitates, as well as Mg and Zn solutes and $Al_3Zr$ dispersoids. The deleterious effect of Zn addition on the stress corrosion cracking, particularly in extrusions, is compensated by keeping the level of Zn to a value below 3.8 wt. % and using combination of appropriate levels of Si and Cu in solid solution.

The alloy plates, coils and sheets of the invention can be manufactured by preheating, hot rolling, cold rolling with or without inter-annealing and final heat treatment of an Al—Mg—Zn—Si alloy slab of the selected composition. It is to be understood that products of an Al—Mg—Zn—Si alloy can also be manufactured by forging.

The conditions are preferably that the temperature for is in the range 400–600° C. and the time for is not more than 36 hours. The preheat to hot rolling is typically performed in the range 350–600° C. If required the final or intermediate annealing is preferably at temperatures in the range 200–550° C. and soak period at the annealing temperature in the range 5 min. to 20 hours.

Artificial ageing can be carried out using a single or multiple step cycle at temperatures in the range 75–250° C.

The alloy extrusions of the invention can be manufactured by preheating, extrusion, and annealing of an Al—Mg—Zn—Si alloy billet of the selected composition. The conditions are preferably that the temperature for preheat is in the range 400–600° C. and the time for homogenisation is not more than 400–600° C. The extrusion temperature is in the range 350–600° C., and the extrusion sections can either be water or air quenched upon exiting from the die. The extrusions of the alloys may subsequently be heat treated to produce all known tempers such as T4 and T6, similar to rolled products. However, if the extrusion conditions are appropriately selected, it is possible to obtain solution heat treated microstructure after exiting from the die. In such cases, the profiles need to be only artificial aged to produce T6 temper. The extrusions may be stretched to improve the flatness.

The reasons for the limitations of the alloying elements and the processing conditions of the aluminium alloy according to the present invention are described below. All composition percentages are by weight.

Mg: Mg in combination with Zn and Si provides the basic strength to the alloy according to the present invention. Mg levels below 0.5% do not provide sufficient strength in the welded condition. However, if the Mg level exceeds 1.5%, the alloy according to the present invention has no better extrudability than the existing AA6082-alloy. The preferred level of Mg is 0.5–1.0%, as a compromise between ease of fabrication and strength.

Zn: Zn in combination with Mg is an important strengthening element in the alloy, since these elements form precipitates/GP zones in the heat affected zones of weldaments of the alloy according to the present invention. Zinc also contributes to the corrosion resistance of the alloy. In order to maximise the strength increase in the heat affected zone it is preferred to maintain a Zn/Mg-ratio of 5 or more. Below 0.1% the zinc addition does not provide sufficient intergranular corrosion resistance equivalent to that of 6082-alloy. In a preferred embodiment the lower limit of the zinc addition is 1.0%, and in a more preferred embodiment 1.5% in order to maximise the strength increase. Although higher levels of Mg and Zn are preferred from a strength point of view, in order to avoid stress corrosion related problems in weldaments, it is preferred to use not more than 3.8%.

Si: Si forms $Mg_2Si$ which contributes significantly to the strength of the alloy according to the invention, especially in the unwelded condition. The Si-level in the alloy should be such that it is in excess of that required to form coarse Al—Fe—Si phase particles (during casting) and should allow the formation of sufficient $MgZn_2$-phase particles in the heat affected zone. The preferred range for Si is 0.1–1.0% for welding and extrusion application, and in the range of 0.05–0.75% for brazing applications.

Mn: Mn is an important additive for the strength of the alloy, since it forms $MnAl_6$-dispersoids. Since levels above 0.8% causes reduction in the extrudability, the Mn level in the alloy according to the invention should not exceed 0.8%, it is preferred to use Mn in the range of 0.2–0.6%.

Zr: Zr is important for achieving strength improvements in the work-hardened tempers of the alloy. Zr is also important for resistance against cracking during welding of the plates or the extrusions of the alloy. Zr levels above 0.25% tend to result in very coarse needle-shaped primary particles which decreases ease of fabrication of the alloy and bendability of the alloy plates, and therefore the Zr level must be not more than 0.25%. The minimum level of Zr is 0.05% and to provide sufficient strength in the work-hardened tempers a preferred Zr range of 0.10–0.20% is employed.

Cr: cr improves the corrosion resistance of the alloy. However, Cr limits the solubility of Mn and Zr. Therefore, to avoid formation of coarse primaries, the Cr level must be not more than 0.3%. A preferred range for Cr is 0–0.15%.

Cu: Cu should be not more than 0.3%. Cu levels above 0.3% gives rise to unacceptable corrosion resistance of the alloy rolled product or extrusions of the invention. The preferred level for Cu is not more than 0.1%.

Fe: Fe forms Al—Fe—Mn compounds during casting, thereby limiting the beneficial effects. Fe levels above 0.5% causes formation of coarse primary particles which decrease the fatigue life of the welded joints of the alloy of the invention. The preferred range for Fe is 0.15–0.30%.

Ag: Ag may optionally be included in the alloy up to a maximum of 0.4%, preferably at least 0.05%, to improve further the stress corrosion resistance.

Ti: Ti is important as a grain refiner during solidification of both ingots and welded joints produced using the alloy of the invention. However, Ti in combination with Zr forms undesirable coarse primaries. To avoid this, Ti levels must be not more than 0.2% and the preferred range for Ti is not more than 0.1%. A suitable minimum level for Ti is 0.03%.

The balance is Al and inevitable impurities. Typically each impurity element is present at 0.05% maximum and the total of impurities is 0.15% maximum.

Methods of making the products of the invention will now be described.

The casting of an Al—Mg—Zn—Si alloy ingot of the selected composition can be achieved using conventional semi-continuous process, e.g. DC-casting and Electromagnetic casting, or by conventional continuous casting processes.

Using a continuous casting process the need for a hot-rolling process step can be overcome.

The homogenisation prior to hot-rolling is usually carried out at a temperature in the range 400–600° C. in single or in multiple steps. In either care, preheating decreases the segregation of alloying elements in the as-cast material. If the treatment is carried out below 400° C., the resultant homogenisation effect is inadequate. Due to substantial increase in deformation resistance of the ingot, industrial hot rolling is difficult for temperatures below 400° C. If the temperature is above 600° C., eutectic melting might occur resulting in undesirable pore formation. The preferred time for the above preheat treatment is between 1 to 36 hours. The preheating to hot-rolling is typically performed in a temperature range of 350–600° C.

For plates, hot rolling is usually done to final thickness preferably down to 8 mm. Below 8 mm and for sheet cold rolling reductions of 20–70% are preferably applied after hot rolling. If the final thickness of sheet requires an interanneal or a final temper annealing is necessary, it is typically performed in the range of 200–550° C. for soak periods between 5 min. and 10 hours. For natural or artificial aged tempers (e.g. T3/T351 resp. T6/T651) solution heat treatment subsequently is performed with preferred temperatures between 350 and 550° C. and soak times up to 3 hours depending on the thickness of the material. Fast cooling preferably by moved air or water quench follows usually immediately. Controlled stretching may follow to achieve flatness, reduce residual stresses or improve strength or achieve all of these feature. Artificial ageing may follow consisting of treatment in temperature ranges between 75 and 250° C. It may consist of more than one temperature and soak time to achieve optimum balance of properties such as strength and corrosion resistance.

Coil products are preferably hot rolled in a first rolling operation with similar parameters as hot rolled plates. In a second immediately following hot rolling step the slab is rolled to coils of intermediate thickness up to about 10 mm. Cold rolling of coil may follow in reductions of 20–70% with similar parameters as for cold rolled sheet. Also the parameters for interannealing, annealing, solution heat treatment or artificial ageing for sheet may apply to coils, where stretching is usually replaced by tension levelling.

In the manufacture of extrusions, the homogenisation step is usually done at a temperature in the range 400–600° C. for a period of not more than 30 h. The homogenisation step cycle may involve soaks at more than one temperature. The different soaks may signify the need for specific metallurgical reactions such as dissolution of Mg and/or Zn containing eutectics, spherodisation of Fe containing intermetallics. From the soak temperature, the ingots are cooled to room temperature, and a fast quenching like water quenching is preferred to improve extrudability.

The preheating prior to extrusion is usually done at a temperature in the range 350–600° C. in a gas furnace for 1–24 hours or an induction furnace for 1–10 minutes. Excessively high temperature such as 600° C. is normally avoided to ensure good surface quality of extruded products. Extrusion can be done on an extrusion press with a one- or a multi-hole die depending on the available pressure and billet sizes. A large variation in extrusion ratio 10–100 can be applied with extrusion speeds typically in the range 0.5–10 m/min.

After extrusion, the extruded section can be water or air quenched. Annealing can be carried out in a batch annealing furnace by heating the extruded section to a temperature in the range 350–550° C., and may be needed if the artificial ageing response of the extruded section is found inadequate. The profiles, either after a separate solution heat treatment or directly after extrusion process, can be artificially aged at a temperature in the range 75–250° C. The artificial ageing treatment may consist of soaking at more than one temperature. Artificial ageing involving multiple soaks may be necessary to achieve optimum combination of properties such as strength and corrosion resistance.

The alloy in accordance with the invention can be extruded in any configurations including channels, bars, I-beams, angles tubing, rectangular hollows, rods or other complicated shapes.

The aluminium alloy in accordance with the present invention can further be used as a weld filler alloy for use as filler wire.

The weld filler alloy of the present invention is most preferably provided in the form of drawn wire. The wire may be produced, for example, by extruding the alloy through a multiple hole die at a temperature range of 200–500° C. and a ram speed in a range of 1–25 m/min. The extruded rod may then be drawn into wire using multiple drawing steps. Extrusion ratios typically used to draw aluminium wire may be employed. During the wire drawing operation intermediate annealing of the alloy in a temperature in the range of 250–550° C. may be employed. The drawn wire may then be finally annealed, if required, in a temperature range of 250–550° C. Each annealing step may have a soak period in the range 10 min. to 10 hours. The diameter of the finished drawn wire is typically in a range of 0.6–6.0 mm. The wire may also be produced by continuously casting the alloy in the form, for example, of a round bar. The bars may be either coiled directly or after a rolling step, and then subsequently drawn to produce weld filler wire.

EXAMPLES

Example 1

Table 1 lists the chemical composition (in wt. %) of the billets used to produce T4 and T6 temper materials, where alloy A13 is within the standard alloy AA6082. Apart from the alloy A13, all the other alloys were homogenised at 470° C. for a period of 12 hours. The alloy A13 was soaked at 570° C. for 8 hours and subsequently water-cooled to room temperature. The billets were cooled to room temperature and extrusion billets were machined out from the homogenised billets. The extrusion billets were then preheated to 475° C. prior to extrusion and extruded with an extrusion ratio of 1:27 to a flat shape using a direct press. The extruded profiles were air quenched upon exiting from the press. Except for the A13 alloy, the T6 temper was produced by artificially ageing the profiles at 120° C. for 10 hours. The T6 temper of the alloy A13 was produced by ageing the profile at 160° C. for a period of 8 hours. The T4 temper was produced by 50 days of natural ageing. The tensile properties and corrosion resistance of the resultant materials are listed in Table 2.

In Table 2, PS is proof strength in MPa, UTS is ultimate tensile strength in MPa, and Elong is maximum elongation in %.

The materials were assessed for corrosion resistance using the EXCO-test (ASTM G34). N, EA, PA, PB indicate the results of the EXCO-test, N representing the best results.

From these results it can be seen that as compared to the A13-alloy, all the other alloys are stronger in the T4 temper. In general, the microstructure in the heat affected zone of welded panels is similar to that in the T4 temper. Therefore, any strength increase in T4 temper would imply a corresponding increase in the strength of the heat affected zone after welding. Since the proof strength of a welded panel is approximately the strength of the heat affected zone, the alloys in accordance with the invention are expected to be stronger in the welded condition as compared to alloy A13. The comparability of the EXCO-test results in the T4 temper illustrate that the corrosion resistance of the alloys are similar.

Example 2

Table 3 lists the chemical composition (in wt. %) of the ingots used to produce core material to be used for brazing.

An important prerequisite for brazing is that: the core material should not have any low melting eutectics or phases. Samples of the alloys in the as-cast condition were analysed using Differential Scanning Calorimetry (DSC). Generally, the presence of any low melting eutectics in a given alloy is indicated by a negative peak (endothermic reaction), while melting of a phase is indicated by a negative peak in the DSC-curve. The DSC-curve of the B3 alloy, while the DSC-curves of alloys B1 and B2 showed similar results. The absence of any negative peak in the DSC-curve indicates that there exists no low melting phase or eutectics in the alloy in accordance with the present invention, which means that the alloy can be used as core alloy for manufacturing brazing sheet.

The ingots of the alloys B1–B3 were preheated to 430° C. and hot rolled to a gauge of 2.7 mm. The hot rolled sheets were further cold rolled to 0.4 mm. Tensile samples from the cold rolled sheets were exposed to 590° C. for a period of 10 min. to simulate a brazing cycle. After this heat-treatment the samples were air-cooled to room temperature and tensile properties were determined, which are listed in Table 4. In Table 4, PS is proof strength in MPa, and UTS is ultimate tensile strength in MPa. As compared to the standard 3XXX-series core alloys with a post-braze proof strength of 50–65 MPa, the alloys in accordance with the invention have significant higher strength.

TABLE 3

| Alloy | Mg | Zn | Si | Mn | Cu | Zr | Fe | Cr | Al |
|---|---|---|---|---|---|---|---|---|---|
| B1 | 0.5 | 2.5 | 0.08 | 0.75 | <0.01 | 0.12 | 0.17 | — | bal. |
| 62 | 0.7 | 3.0 | 0.08 | 0.75 | <0.01 | 0.12 | 0.17 | — | bal. |
| B3 | 0.7 | 2.5 | 0.08 | 0.75 | <0.01 | 0.12 | 0.18 | 0.10 | bal. |

TABLE 4

| Alloy | PS (MPa) | UTS (MPa) |
|---|---|---|
| B1 | 90 | 152 |
| B2 | 100 | 160 |
| B3 | 105 | 162 |

TABLE 1

| Alloy | Mg | Zn | Si | Mn | Zr | Fe | Cu | Al |
|---|---|---|---|---|---|---|---|---|
| A1 | 0.5 | 2.5 | 0.08 | 0.5 | 0.06 | 0.17 | <0.01 | remainders |
| A2 | 0.7 | 3.5 | 0.08 | 0.5 | 0.06 | 0.17 | <0.01 | remainders |
| A3 | 0.7 | 3.5 | 0.08 | 0.75 | 0.06 | 0.18 | <0.01 | remainders |
| A4 | 0.7 | 3.5 | 0.08 | 0.25 | 0.06 | 0.17 | <0.01 | remainders |
| A5 | 0.7 | 3.5 | 0.08 | 0.5 | 0.12 | 0.17 | <0.01 | remainders |
| A6 | 0.7 | 3.5 | 0.08 | 0.5 | 0.16 | 0.17 | <0.01 | remainders |
| A7 | 0.5 | 3.5 | 0.08 | 0.5 | 0.06 | 0.17 | <0.01 | remainders |
| A8 | 0.7 | 2.5 | 0.1 | 0.5 | 0.06 | 0.17 | <0.01 | remainders |
| A9 | 0.7 | 3.5 | 0.1 | 0.5 | 0.06 | 0.25 | <0.01 | remainders |
| A10 | 0.7 | 3.5 | 0.1 | 0.5 | 0.06 | 0.10 | 0.1 | remainders |
| A11 | 1.0 | 1.2 | 0.1 | 0.25 | 0.06 | 0.17 | <0.01 | remainders |
| A12 | 0.7 | 2.0 | 0.1 | 0.5 | 0.12 | 0.17 | <0.01 | remainders |
| A13 | 0.8 | — | 0.90 | 0.65 | — | 0.20 | <0.01 | remainders |
| A14 | 0.7 | 0.3 | 1.1 | 0.76 | 0.06 | 0.25 | 0.3 | remainders |
| A15 | 0.9 | 1.0 | 0.1 | 0.76 | 0.12 | 0.25 | <0.01 | remainders |
| A16 | 0.8 | 1.5 | 0.08 | 0.76 | 0.12 | 0.17 | <0.01 | remainders |

TABLE 2

| | T4 Temper | | | | T6 Temper | | | |
|---|---|---|---|---|---|---|---|---|
| Alloy | PS | UTS | Elong (%) | EXCO TEST | PS | UTS | Elong (%) | EXCO TEST |
| A1 | 151 | 261 | 17 | N/EA | 165 | 273 | 16 | N/PA |
| A2 | 165 | 273 | 16 | N/EA | 186 | 275 | 17 | N/PA |
| A3 | 173 | 285 | 15 | N/EA | 201 | 287 | 16 | PA |
| A4 | 163 | 270 | 17 | N | 175 | 272 | 15 | PB |
| A5 | 175 | 300 | 14 | N/EA | 220 | 305 | 12 | N/PA |
| A6 | 190 | 310 | 15 | N/EA | 235 | 315 | 11 | N/PA |
| A7 | 153 | 264 | 13 | N/EA | 190 | 275 | 15 | PA |
| A8 | 158 | 270 | 14 | N/EA | 195 | 285 | 16 | PA |
| A9 | 164 | 274 | 16 | N/EA | 182 | 290 | 18 | PA |
| A10 | 169 | 270 | 17 | N/EA | 184 | 291 | 16 | EA |
| A11 | 183 | 290 | 13 | N/EA | 190 | 295 | 14 | PA |
| A12 | 152 | 252 | 18 | N/EA | 160 | 260 | 21 | N |
| A13 | 140 | 240 | 17 | N/EA | 290 | 335 | 13 | PB |
| A14 | 150 | 251 | 17 | N/EA | 165 | 318 | 15 | PB |
| A15 | 145 | 243 | 19 | N | 160 | 268 | 19 | N/PA |
| A16 | 147 | 245 | 18 | N | 164 | 270 | 21 | N/PA |

What is claimed is:

1. Aluminium-magnesium-zinc-silicon alloy, in the form of an extruded and rolled product, consisting of the following composition in weight percent:

Mg 0.5–1.5
Zn 2.5–3.8
Si 0.05–1.5
Mn 0.2–0.8
Zr 0.05–0.25
Cr 0.3 max.

Cu<0.3
Fe 0.15–0.30%
Ag 0.4 max.
Ti 0.2 max.
balance Al and inevitable impurities,
wherein the Zn/Mg-ratio is 5 or more.

2. Aluminium-magnesium-zinc-silicon alloy according to claim 1, wherein the Mg content is in the range of 0.5–1.0 wt. %.

3. Aluminium-magnesium-zinc-silicon alloy according to claim 1, wherein the Mn-content is in the range of 0.2–0.6 wt. %.

4. Aluminium-magnesium-zinc-silicon alloy according to claim 1, wherein the Zr-content is in the range of 0.1–0.2 wt. %.

5. Aluminium-magnesium-zinc-silicon alloy according to claim 1, wherein the Cu-content is not more than 0.1 wt. %.

6. Aluminium-magnesium-zinc-silicon alloy according to claim 1, wherein the Si-content is in the range 1–1.5 wt. %.

7. A plate comprising the alloy of claim 1.

8. A sheet comprising the alloy of claim 1.

9. An extrusion comprising the alloy of claim 1.

10. Aluminium-magnesium-zinc-silicon alloy according to claim 1, wherein the Zr-content is in the range of 0.05–0.12 wt %.

11. Aluminium-magnesium-zinc-silicon alloy according to claim 1, wherein the Si-content is in the range of 0.05–0.1 wt %.

12. Welded structure comprising at least one welded plate or extrusion made of aluminium-magnesium-zinc-silicon alloy, consisting of the following composition in weight percent:
Mg 0.5–1.5
Zn 2.5–3.8
Si 0.05–1.5
Mn 0.2 –0.8
Zr 0.05–0.25
Cr 0.3 max.
Cu<0.3
Fe 0.15–0.30%
Ag 0.4 max.
Ti 0.2 max.
balance Al and inevitable impurities,
wherein the Zn/Mg-ratio is 5 or more.

13. Welded structure according to claim 12, wherein the proof strength of the weld of said plate or extrusion is at least 135 MPa.

14. Brazed structure comprising at least one sheet or extrusion made of aluminium-magnesium-zinc-silicon alloy, consisting of the following composition in weight percent:
Mg 0.5–1.5
Zn 2.5–3.8
Si 0.05–1.5
Mn 0.2 –0.8
Zr 0.05–0.25
Cr 0.3 max.
Cu<0.3
Fe 0.15–0.30%
Ag 0.4 max.
Ti 0.2 max.
balance Al and inevitable impurities,
wherein the Zn/Mg-ratio is 5 or more.

15. Brazed structure according to claim 14, wherein the alloy has in the post-brazing state proof strength of at least 70 Mpa.

* * * * *